US007298287B2

(12) United States Patent
Hall et al.

(10) Patent No.: US 7,298,287 B2
(45) Date of Patent: Nov. 20, 2007

(54) TRANSMITTING DATA THROUGH A DOWNHOLE ENVIRONMENT

(75) Inventors: David R. Hall, Provo, UT (US); Joe Fox, Spanish Fork, UT (US); Tyson J. Wilde, Provo, UT (US); Jason Miller, Provo, UT (US)

(73) Assignee: IntelliServ, Inc., Provo, UT (US)

( * ) Notice: Subject to any disclaimer, the term of this patent is extended or adjusted under 35 U.S.C. 154(b) by 450 days.

(21) Appl. No.: 10/906,153

(22) Filed: Feb. 4, 2005

(65) Prior Publication Data

US 2006/0174702 A1 Aug. 10, 2006

(51) Int. Cl.
*G01V 3/00* (2006.01)

(52) U.S. Cl. .................. 340/854.4; 340/853; 324/339; 175/45

(58) Field of Classification Search ............ 340/854.4, 340/853; 324/339; 175/45; 166/250.01
See application file for complete search history.

(56) References Cited

U.S. PATENT DOCUMENTS

| | | | |
|---|---|---|---|
| 2,414,719 | A | 1/1947 | Cloud |
| 3,518,608 | A | 6/1970 | Papadopoulos |
| 4,739,325 | A | 4/1988 | MacLeod |
| 4,788,544 | A | 11/1988 | Howard |
| 6,012,015 | A | 1/2000 | Tubel |
| 6,252,518 | B1 | 6/2001 | Laborde |
| 6,392,317 | B1 | 5/2002 | Hall et al. |
| 6,670,880 | B1 | 12/2003 | Hall et al. |
| 6,688,396 | B2 | 2/2004 | Floerke et al. |
| 6,717,501 | B2 | 4/2004 | Hall et al. |
| 6,799,632 | B2 | 10/2004 | Hall et al. |
| 6,821,147 | B1 | 11/2004 | Hall et al. |
| 6,830,467 | B2 | 12/2004 | Hall et al. |
| 6,844,498 | B2 | 1/2005 | Hall et al. |
| 6,866,306 | B2 | 3/2005 | Boyle et al. |
| 6,888,473 | B1 | 5/2005 | Hall et al. |
| 6,913,093 | B2 | 7/2005 | Hall et al. |
| 6,929,493 | B2 | 8/2005 | Hall et al. |
| 6,945,802 | B2 | 9/2005 | Hall et al. |
| 6,968,611 | B2 | 11/2005 | Hall et al. |
| 2003/0173072 | A1 | 9/2003 | Vinegar |
| 2004/0039466 | A1 | 2/2004 | Lilly et al. |
| 2004/0104797 | A1 | 6/2004 | Hall et al. |

(Continued)

OTHER PUBLICATIONS

PCT/US03/16475, Published Dec. 4, 2003, Applicant Baker Hughes; International Search Report: "Documents Considered to Be Relevant".

*Primary Examiner*—Jeffery Hofsass
*Assistant Examiner*—Sisay Yacob
(74) *Attorney, Agent, or Firm*—Tyson J. Wilde; Jeffery E. Daly

(57) ABSTRACT

The invention is a system for transmitting data through downhole environments comprising a downhole network integrated into a downhole tool string. The downhole tool string comprises a plurality of downhole components. Each downhole component also comprises a conductor intermediate and operably connected to mating communication elements proximate the ends of the downhole component. The mating communication elements comprise magnetically conductive portions with different curie temperatures. The magnetically conductive portion may comprise segments or solid portions adapted to operate in the harsh downhole environments with temperatures ranging from 25 C to 275 C. Each downhole component is selected from the group consisting of drill pipes, drill collars, bottom hole assemblies, reamers, jars and/or production pipes.

28 Claims, 11 Drawing Sheets

U.S. PATENT DOCUMENTS

| | | | | |
|---|---|---|---|---|
| 2004/0113808 | A1 | 6/2004 | Hall et al. | |
| 2004/0144541 | A1 | 7/2004 | Picha | |
| 2004/0145492 | A1 | 7/2004 | Hall et al. | |
| 2004/0150532 | A1 | 8/2004 | Hall et al. | |
| 2004/0164833 | A1 | 8/2004 | Hall et al. | |
| 2004/0164838 | A1 | 8/2004 | Hall et al. | |
| 2004/0216847 | A1 | 11/2004 | Hall et al. | |
| 2004/0244864 | A1 | 12/2004 | Hall et al. | |
| 2004/0244916 | A1 | 12/2004 | Hall et al. | |
| 2004/0248142 | A1 | 12/2004 | Hall et al. | |
| 2005/0001735 | A1 | 1/2005 | Hall et al. | |
| 2005/0001736 | A1 | 1/2005 | Hall et al. | |
| 2005/0001738 | A1 | 1/2005 | Hall et al. | |
| 2005/0035874 | A1 | 2/2005 | Hall et al. | |
| 2005/0035875 | A1 | 2/2005 | Hall et al. | |
| 2005/0035876 | A1 | 2/2005 | Hall et al. | |
| 2005/0036507 | A1 | 2/2005 | Hall et al. | |
| 2005/0039912 | A1 | 2/2005 | Hall et al. | |
| 2005/0045339 | A1 | 3/2005 | Hall et al. | |
| 2005/0046586 | A1 | 3/2005 | Hall et al. | |
| 2005/0048590 | A1 | 3/2005 | Hall et al. | |
| 2005/0067159 | A1 | 3/2005 | Hall et al. | |
| 2005/0070144 | A1 | 3/2005 | Hall et al. | |
| 2005/0082092 | A1 | 4/2005 | Hall et al. | |
| 2005/0092499 | A1 | 5/2005 | Hall et al. | |
| 2005/0093296 | A1 | 5/2005 | Hall et al. | |
| 2005/0095827 | A1 | 5/2005 | Hall et al. | |
| 2005/0115717 | A1 | 6/2005 | Hall et al. | |
| 2005/0145406 | A1 | 7/2005 | Hall et al. | |
| 2005/0150653 | A1 | 7/2005 | Hall et al. | |
| 2005/0161215 | A1 | 7/2005 | Hall et al. | |
| 2005/0173128 | A1 | 8/2005 | Hall et al. | |
| 2005/0212530 | A1 | 9/2005 | Hall et al. | |
| 2005/0236160 | A1 | 10/2005 | Hall et al. | |
| 2005/0264293 | A1* | 12/2005 | Gao et al. | 324/326 |
| 2005/0279508 | A1 | 12/2005 | Hall et al. | |
| 2005/0284659 | A1 | 12/2005 | Hall et al. | |
| 2005/0284662 | A1 | 12/2005 | Hall et al. | |
| 2005/0284663 | A1 | 12/2005 | Hall et al. | |
| 2005/0285645 | A1 | 12/2005 | Hall et al. | |
| 2005/0285705 | A1 | 12/2005 | Hall et al. | |
| 2005/0285706 | A1 | 12/2005 | Hall et al. | |
| 2005/0285752 | A1 | 12/2005 | Hall et al. | |
| 2005/0285754 | A1 | 12/2005 | Hall et al. | |
| 2005/0286751 | A1 | 12/2005 | Hall et al. | |

* cited by examiner

TRANSMITTING DATA THROUGH A DOWNHOLE ENVIRONMENT

BACKGROUND OF THE INVENTION

This invention relates to oil and gas drilling, and more particularly to an apparatus for reliably transmitting information through harsh downhole environments. The present invention relates to the field of data transmission systems through downhole components. In the past several decades engineers have been attempting to develop apparatuses to transmit data from a downhole tool string to the surface. Oil companies may use these downhole measurements to make decisions during the drilling process by using sophisticated techniques for systems such as Measurement While Drilling (MWD) and Logging While Drilling (LWD). These techniques typically rely on instantaneous knowledge about the geologic and other formations that are being drilled in order for the dill rig operators to best determine the depth, azimuth, drill speed, weight on bit, and other characteristics desired to complete the borehole formation.

U.S. Pat. No. 6,670,880 to Hall et, al. which is incorporated herein by reference for all that it teaches, discloses a system for transmitting data through a string of downhole components. In one aspect, the system includes first and second magnetically conductive, electrically insulating elements at both ends of the component. Each element includes a first U-shaped trough with a bottom, first and second sides and an opening between the two sides. Electrically conducting coils are located in each trough. An electrical conductor connects the coils in each component. In operation, a varying current applied to a first coil in one component generates a varying magnetic field in the first magnetically conductive, electrically insulating element, which varying magnetic field is conducted to and thereby produces a varying magnetic field in the second magnetically conductive, electrically insulating element of a connected component The magnetic field thereby generates a varying electrical current in the second coil in the connected component.

Downhole information may help a drilling crew to make decisions in real time. This may save the crew time and money. In inductive transmission systems, magnetically conductive materials are affected by varying temperatures in downhole environments. When a magnetically conductive material reaches its curie temperature it looses its magnetic properties.

U.S. Patent application 20040144541 to Picha, which is incorporated herein by reference for all that it teaches, discloses an embodiment of a system configured to heat at least a part of a subsurface formation. The system comprising: an AC power supply; one or more electrical conductors configured to be electrically coupled to the AC power supply and placed in an opening in the formation At least one of the electrical conductors comprises a heater section. The heater section comprising an electrically resistive ferromagnetic material configured to provide an electrically resistive heat output when AC is applied to the ferromagnetic material. The heater section is then configured to provide a reduced amount of heat near or above a selected temperature during use due to the decreasing AC resistance of the heater section when the temperature of the ferromagnetic material is near or above the selected temperature; and wherein the system is configured to allow heat to transfer from the heater section to a part of the formation. The ferromagnetic material may comprise two or more ferromagnetic materials with different Curie temperatures.

BRIEF SUMMARY OF THE INVENTION

The invention is a system for transmitting data through downhole environments in a downhole network integrated into a downhole tool string. The downhole tool string comprises a plurality of downhole components. Each downhole component comprises a conductor intermediate and operably connected to mating communication elements proximate the ends of the downhole component. The mating communication elements comprise a magnetically conductive portion. The magnetically conductive portion may comprise segments or solid portions adapted to operate in the harsh downhole environments with varying temperatures. Each downhole component is selected from the group consisting of drill pipes, drill collars, bottom hole assemblies, reamers, jars and/or production pipes.

The magnetically conductive portion comprises a conductive material selected from the group consisting of ferrite, Ni, Fe, Cu, Mo, Mn, Co, Cr, V, C, Si, alloys and combinations thereof. The magnetically conductive portion may also comprise a trough disposed in an annular housing and a coil residing within a recess of the trough. The magnetically conductive material may also be a metallic powder suspended in an electrically insulating material. Also the magnetically conductive portion may comprise a laminated portion disposed within the housing. The magnetically conductive portion may be sintered or hot-pressed to reduce porosity.

The mating communications elements may comprise a first curie temperature for a first downhole environment and a second curie temperature for a second downhole environment. The mating elements may also comprise multiple curie temperatures throughout the downhole tool string. The mating communication elements may comprise magnetically conductive segments wherein a first segment comprises a first curie temperature, a second segment comprises a second curie temperature and a third segment comprises a third curie temperature. The segments may be disposed within the annular housing. The first segment may be disposed adjacent to the second, and the third may be disposed adjacent to the first and/or second segments. A communication element comprising different curie temperatures may transmit data in multiple downhole environments each comprising different temperatures.

The mating communications elements may further comprise an electrically insulating material such as a polymer selected from the group consisting of silicone, epoxies, polyurethanes, nylons, greases, rubbers, polyethylenes, polypropylenes, polystyrenes, polyether ether ketones, polyether ketone ketones and/or fluoropolymers. The polymer may be used as a filler material for gaps between the segments.

DETAILED DESCRIPTION OF THE INVENTION AND THE PREFERRED EMBODIMENT

Figure 1:
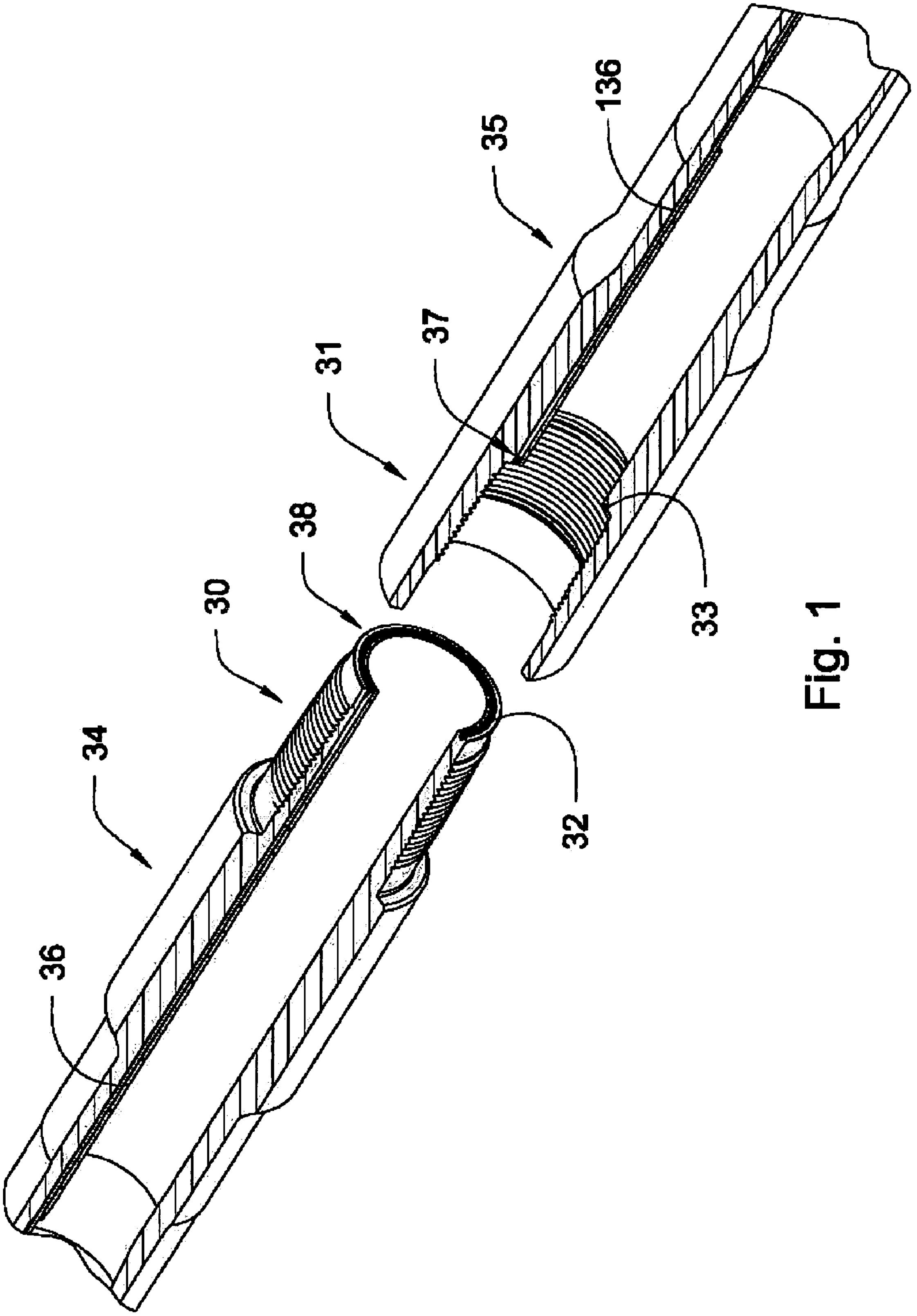
FIG. 1 is a perspective cross sectional view of a downhole component containing a mating communication element.

Referring to the figures, FIG. 1 is a perspective cross sectional view of a downhole component 34 wherein a secondary shoulder 38 of a pin end 30 of a downhole component 34 comprises an annular groove 32. FIG. 1 also illustrates a partial cross sectional view of an adjacent downhole component 35 wherein another secondary shoulder 37 of a box end 31 comprises another groove 33. Mating communication elements 55, 59 (shown in FIG. 6) are situated within the grooves 32, 33 which are respectively connected to cables 36 and 136. The cables run the length of the downhole components 34, 35 and are connected to other mating communication elements (not shown) proximate other ends of the downhole components 34, 35.

Figure 2:
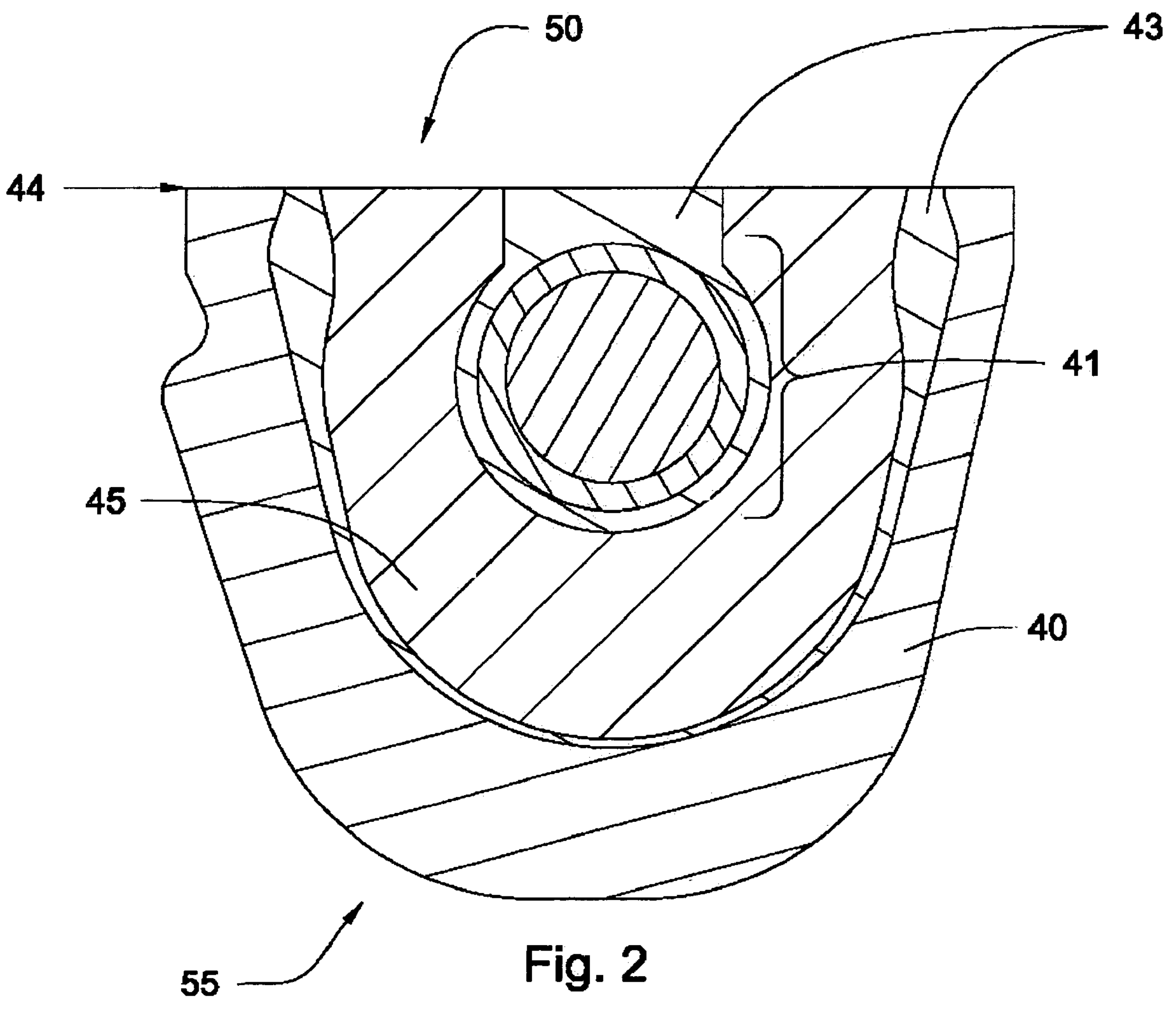
FIG. 2 is a cross sectional view of a mating communication element.

Now referring to FIG. 2, the mating communication element 55 comprises a magnetically conductive portion 50. It is preferred that the magnetically conductive portion 50 be disposed within an annular housing 40. The annular housing is preferably situated in the grooves 32, 33 (shown in FIG. 1) of the downhole components 34, 35. The magnetically conductive portion 50 may be a magnetically conductive annular trough 45. A coil 41 may be disposed within the trough 45. Additionally there may be an electrically insulating filler material 43 disposed in the trough 45 of the mating communication element 55. Preferably, the filler material 43 and magnetically conductive portion comprise a smooth and level contact surface 44.

The magnetically conductive portion 50 may be selected from the group consisting of ferrite, Ni, Fe, Cu, Mo, Mn, Co, Cr, V, C, Si, alloys and combinations thereof. Combinations of such may be known as permalloy, super-permalloy, mollypermalloy, powered iron, soft iron, silicon steel, and other Mu-metals. Preferably the magnetically conductive portion 50 is a Nickel-zinc ferrite with a curie temperature of no less than 220 C. More preferably the magnetically conductive material would have a relative initial permeability of 400 Mu. In physics and electrical engineering, permeability is the degree of magnetization of a material in response to a magnetic field. Absolute permeability is represented by the symbol Mu; which is mathematically defined below: Mu=B/H where B is the magnetic flux density (also called the magnetic induction) in the material and H is the magnetic field strength. Such a ferrite may be purchased from the National Magnetics Group /TCI Ceramics. Alternatively a Nickel-zinc or a Manganese-zinc ferrite of a curie temperature no less than 250 C with a permeability of no less than 100 may be used. In addition, due to the brittle nature of ferrites the annular trough may be segmented 54 (shown in FIG. 3) to prevent cracking and breaking in downhole environments.

The magnetically conductive portion 50, such as ferrite, may be sintered or hot pressed. By sintering the magnetically conductive portion, its porosity may be decreased and therefore provide a smooth and glossy surface which may increase its data transmission efficiency between the mating communications elements 55 and 59 (shown in FIG. 6). Hot pressing may be suited for the synthesis of high performance magneto-electric magnetically conductive portions 50, such as ferrite,. The low sintering temperatures in hot pressing may lead to high resistivity in the magnetically conductive portions 50. Hot pressing may allow synthesis of dense samples free of impurities or chemical in-homogeneities. It may also permit control of key magnetic parameters for inductive coupling, such as permeability and magneto mechanical coupling; which are dependent on grain size and density.

Figure 3:
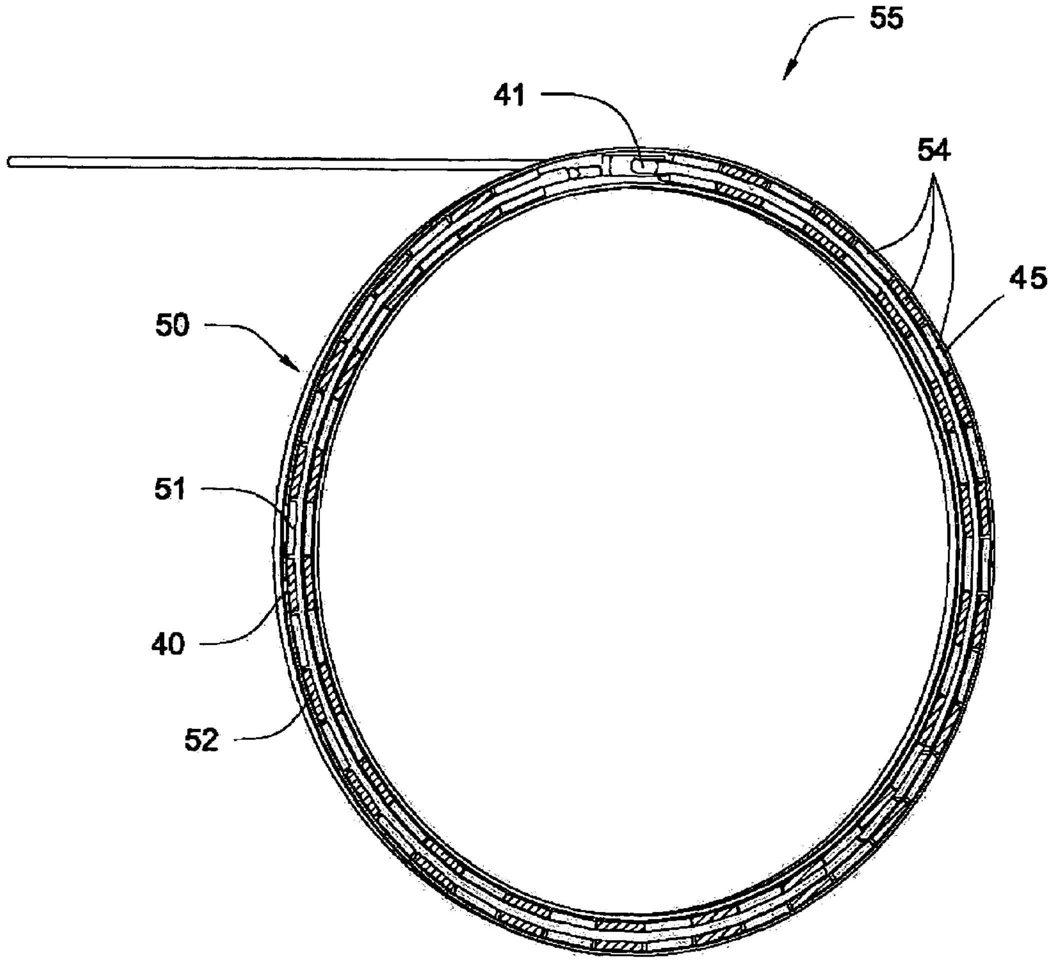
FIG. 3 is a perspective view of a mating communication element.

FIG. 3 is a perspective view of a mating communications element 55. The annular housing 40 is an annular steel ring and the trough 45 comprises magnetically conductive segments portion 54. The coil 41 is disposed within the trough 45. A first magnetically conductive segment 51 with a first curie temperature of no less than 220 C is situated adjacent to a second magnetically conductive segment 52 with a second curie temperature of approximately 250 C.

When a magnetically conductive portion 50 is utilized in a downhole environment the change in temperature and pressure may have an adverse effect on its magnetic conductivity. For example, it is believed that if the first magnetically conductive segment 51 transmits data at an efficiency of 92% at room temperature and is coupled with another portion of the magnetically conductive segments 51 that also transmits at an efficiency of 92% at room temperature, the overall effective data transmission may be 84.5% at room temperature. It is also believed that if the same magnetically conductive segment 51 transmits data at an efficiency of 60% at 200 C, and is coupled with another segment 51 that also has an effectiveness of 60% at 200 C, the overall data transmission efficiency may be 36% at 200 C. Furthermore the second magnetically conductive segment 52 may transmit data at an efficiency of 84% at room temperature, coupled with another second segment 52, the overall effectiveness may be 70.56% at room temperature. At 200 C the second portion of magnetically conductive segments 52 may transmit data with an efficiency of 70%.

When coupled with another second magnetically conductive segment the overall data transmission efficiency may be 49% at 200 C. It is believed that when the first and second magnetically conductive segments 51 and 52 are coupled together such that the first segment 51 has a data transmission efficiency of 92% and the second 52 has an efficiency of 84% at room temperature the overall effectiveness may be 70.56%. However at 200 C when both magnetically conductive segments 51 and 52 are coupled together (the first segment 51 transmitting at a 60% efficiency and the second segment 52 at 70% efficiency) the overall effectiveness may be 42%. It may be desirable to sacrifice some transmission efficiency uphole to increase the data transmission efficiency downhole.

Due to the aforementioned differences in efficiency, the first and second magnetically conductive segments 51 and 52 comprising respectively a first and second curie temperature may be used for a more efficient data transmission between the downhole components. For example, as a drill string advances downhole the environments constantly change in temperature. By using the first magnetically conductive portion 51 with one curie temperature in conjunction with the second magnetically conductive portion 52 with another curie temperature the average data transmission along the entire drill string may be more efficient.

Figure 4:
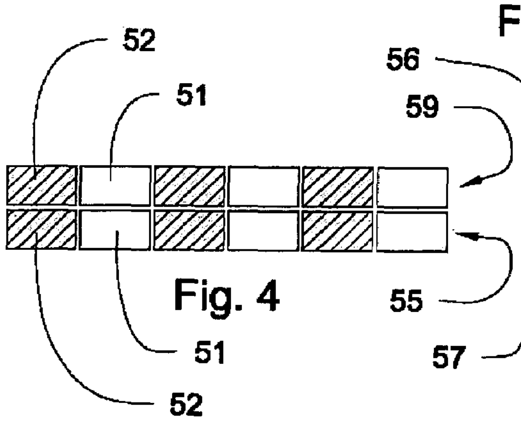
FIG. 4 is a perspective view of magnetically conductive portions from a first and a second mating communications element adjacent one another.
Figure 5:
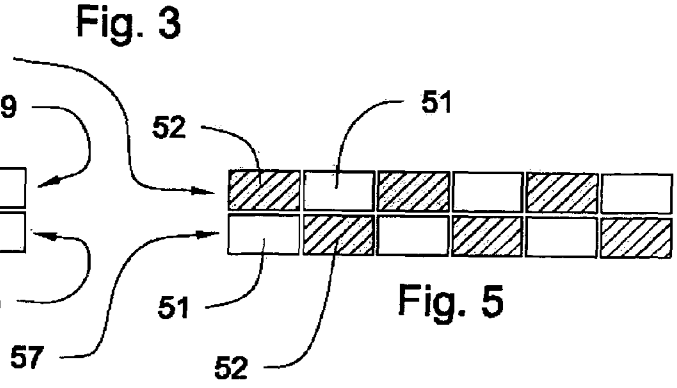
FIG. 5 is a perspective view of magnetically conductive portions from a first and a second mating communications element adjacent one another.

FIG. 4 is a perspective view of mating communication elements. The first communication element 55 comprises the first and second magnetically conductive segments 51, 52 and the second communication element 59 in the adjacent downhole component 35 also comprises first and second magnetically conductive segments 51, 52. FIG. 4 illustrates first magnetically conductive segments 51 opposite the first magnetically conductive segments 51 in the adjacent downhole component 35 and the second magnetically conductive segments 52 opposite the second magnetically conductive segments 52 in the adjacent downhole component 35. FIG. 5 illustrates an alternative arrangement in which the communication elements 55 and 59 may couple together wherein the first magnetically conductive segments 51 mates with the second magnetically conductive segments 52.

Figure 6:
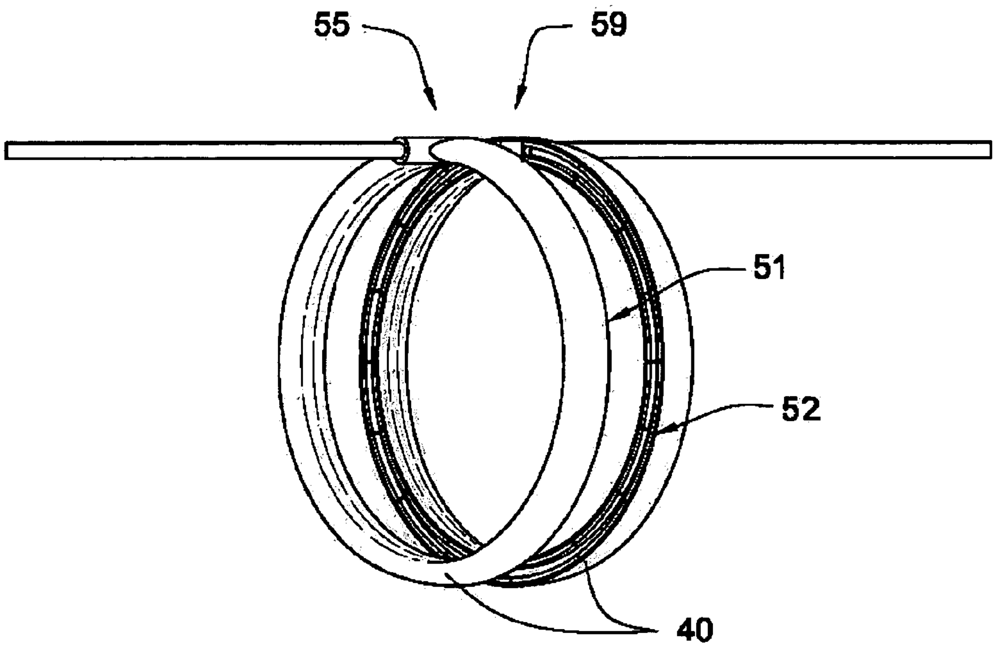
FIG. 6 is a perspective view of mating communication element adjacent one another.
Figure 7:
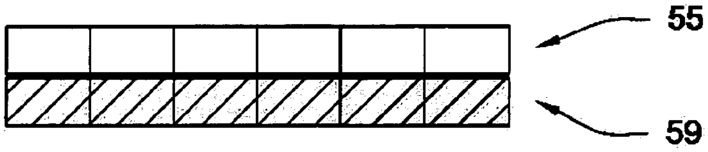
FIG. 7 is a perspective view of magnetically conductive portions from a first and a second mating communications element adjacent one another.
Figure 8:
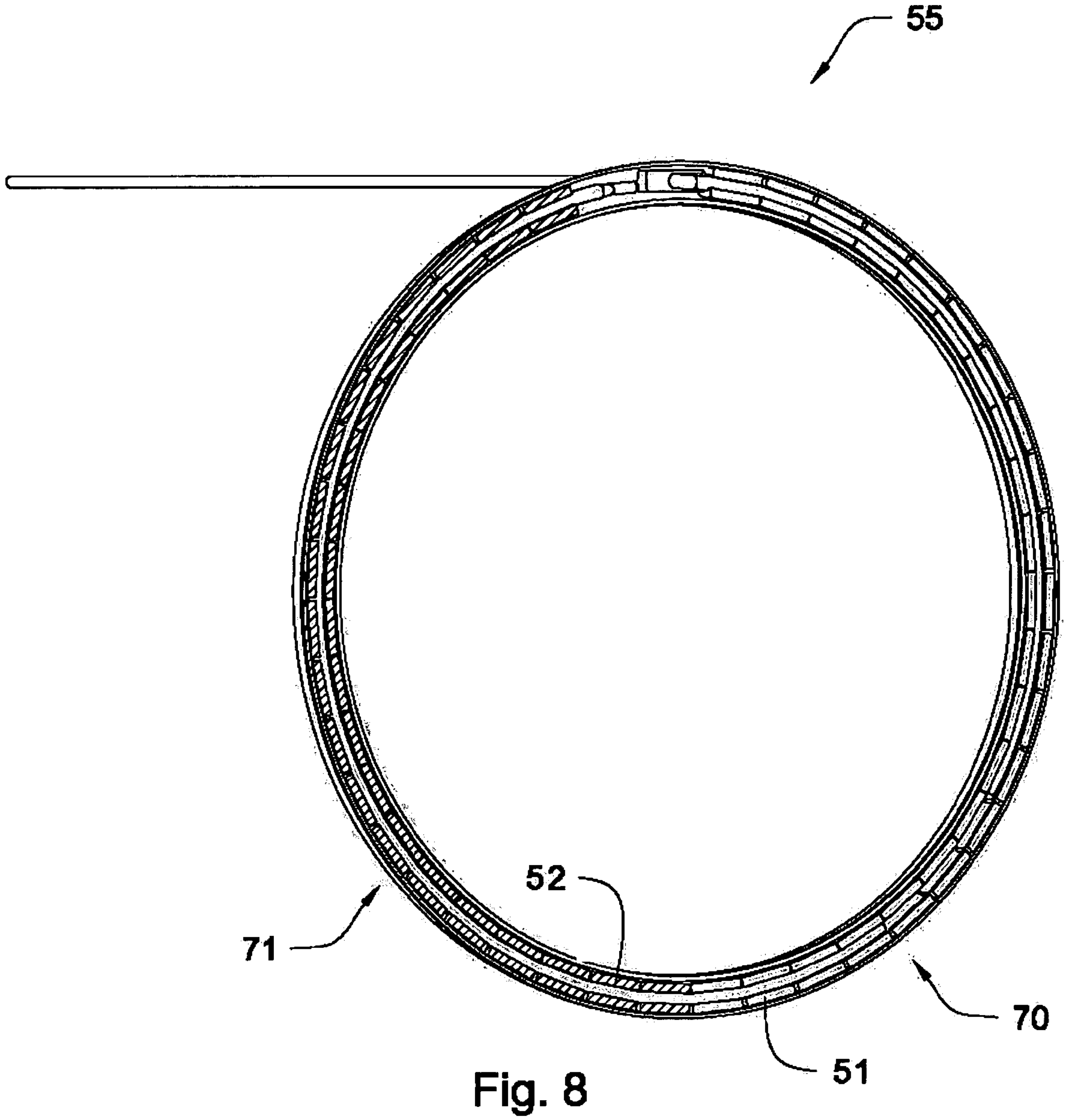
FIG. 8 is a perspective view of magnetically conductive portions disposed within annular housing.

FIG. 6 is a perspective view of mating communication elements 55 and 59. The first communication element 55 may contain a magnetically conductive portion 50 comprising only segments 51 with a first curie temperature within the annular housing 40. Immediately adjacent to the first communication element 55 there may be the second communication element 59 which may comprise the magnetically conductive portion 50 comprising only segments 52 of the second curie temperature within the annular housing 40. FIG. 7 is a perspective view of the first and second communication element 55 and 59 as shown in FIG. 6 mated together. It should be noted that different arrangements of magnetically conductive segments 51, 52 with different curie temperatures are possible within the scope of the claims. FIG. 8 is a perspective view of a mating communication element 55 with a first half 70 with the first magnetically conductive segments 51 and a second half 71 comprising the magnetically conductive segments 52.

Figure 9:
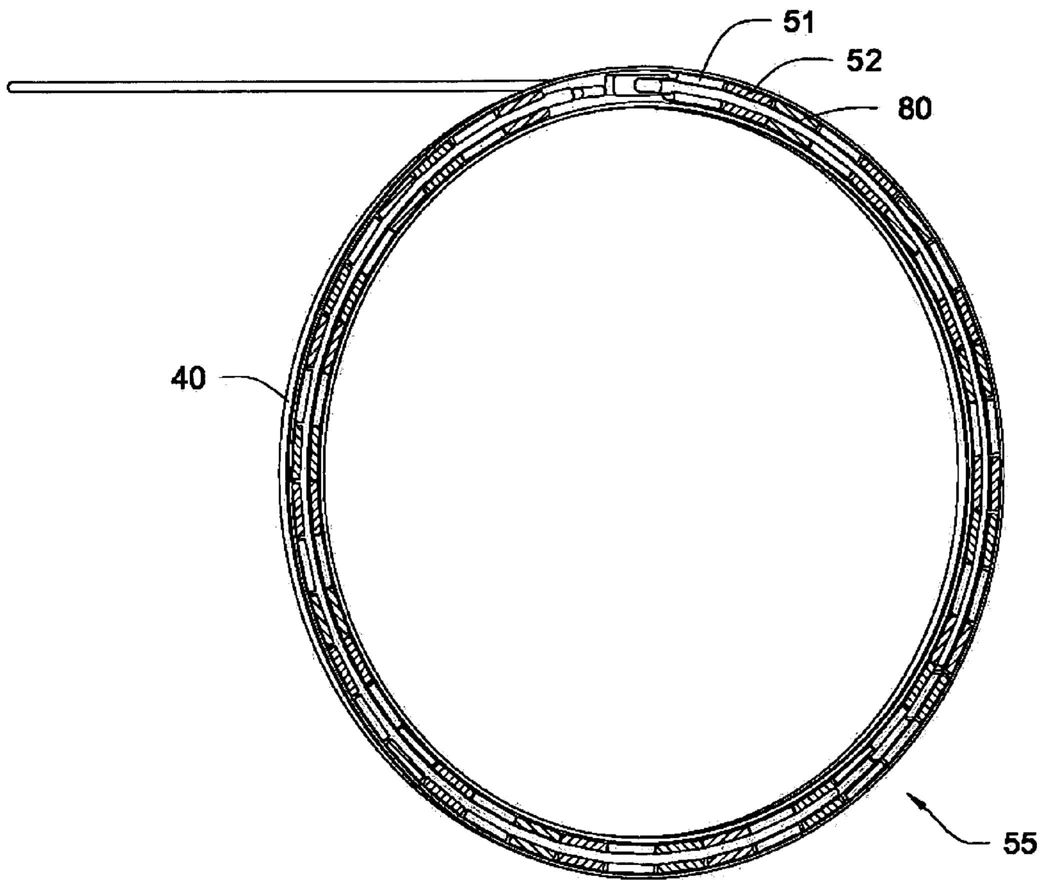
FIG. 9 is a perspective view of a magnetically conductive portion disposed within annular housing.

FIG. 9 is a perspective view of a mating communication element 55. The communication element 55 comprises three magnetically conductive segments 51, 52, and 80 with three different curie temperatures. A first segment 51 comprising the first curie temperature, a second segment 52 comprising the second curie temperature, and a third segment 80 comprising the third curie temperature. Wherein the first, second and third segments 51, 52 and 80 are situated adjacent to one another in the annular housing 40. The combination of the three different segments 61, 62 and 80 may allow for a more efficient data transmission along the drill string than using segments with only a single curie temperature for all of the downhole environments.

Figure 10:
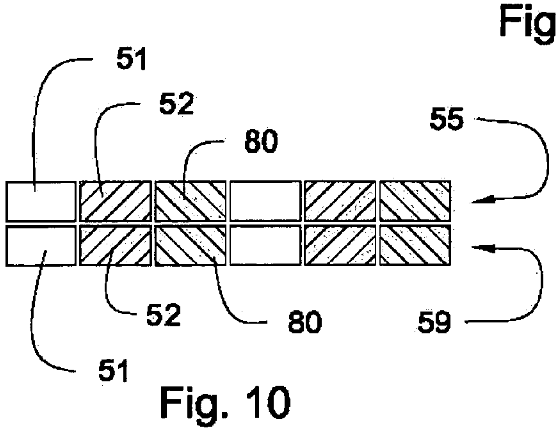
FIG. 10 is a perspective view of magnetically conductive portions from a first and a second mating communications element adjacent one another.
Figure 11:
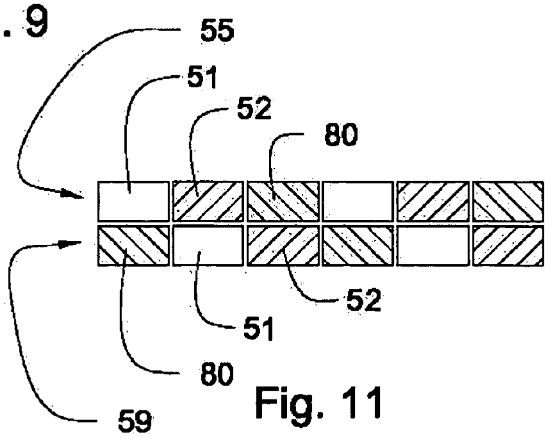
FIG. 11 is a perspective view of magnetically conductive portions from a first and a second mating communications element adjacent one another.
Figure 12:
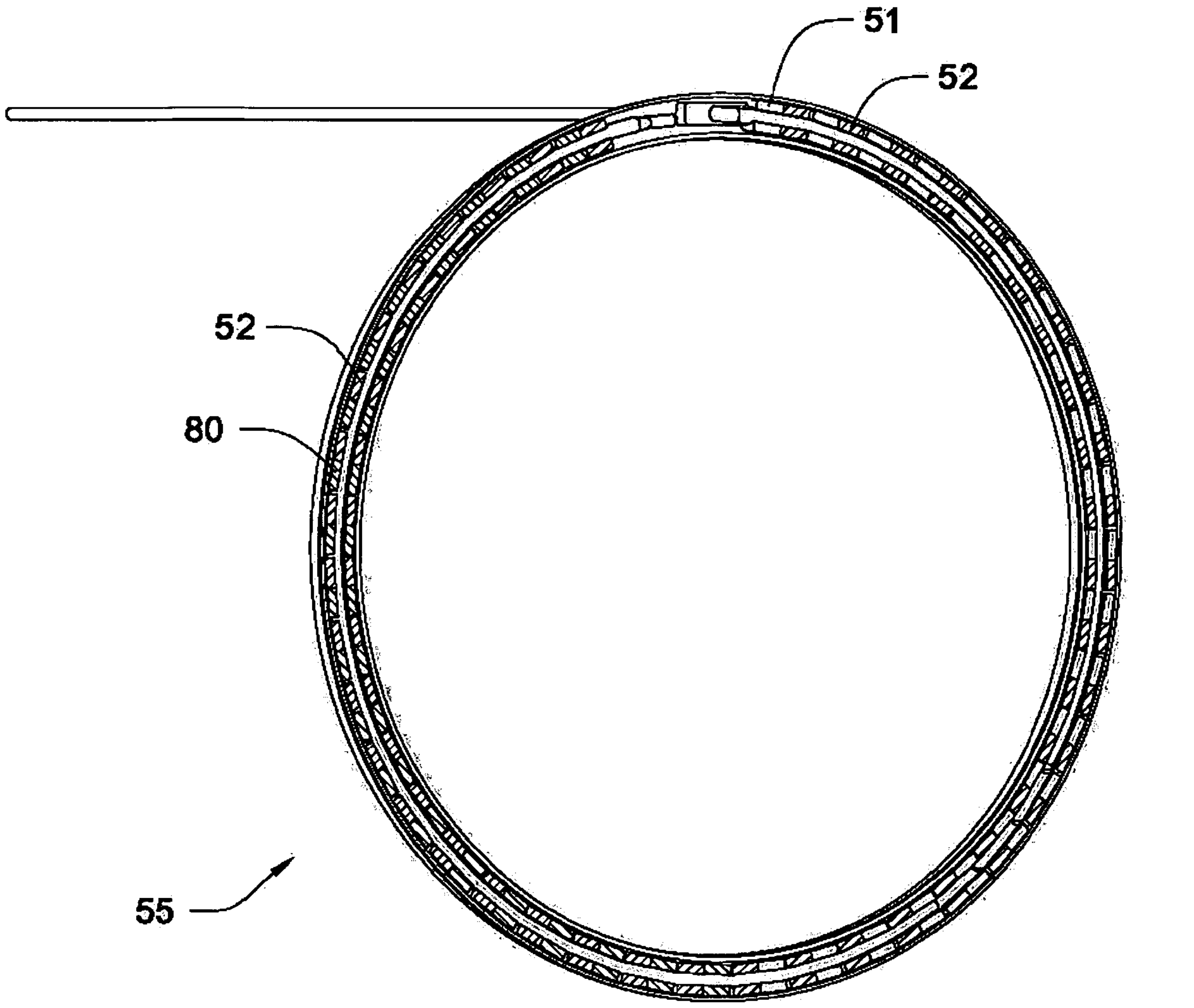
FIG. 12 is a perspective view of a magnetically conductive portion disposed within annular housing.

FIGS. 10 and 11 are perspective views of arrangements of the first, second, and third segments 51, 52, and 80 in the first communication element 55 coupled with the second communication element 59 containing the first, second, and third segments 51, 52, and 80. It would be apparent to one of ordinary skill in the art that other arrangements comprising the first, second, and third segments 51, 52, 80 are possible. It would also be apparent to one of ordinary skill in the art to use more than three different segments comprising more than three different curie temperatures to adjust to downhole temperatures and environments. FIG. 12 is a perspective view of one such arrangement comprising three different portions 51, 52, and 80 with three different curie temperatures.

Figure 13:
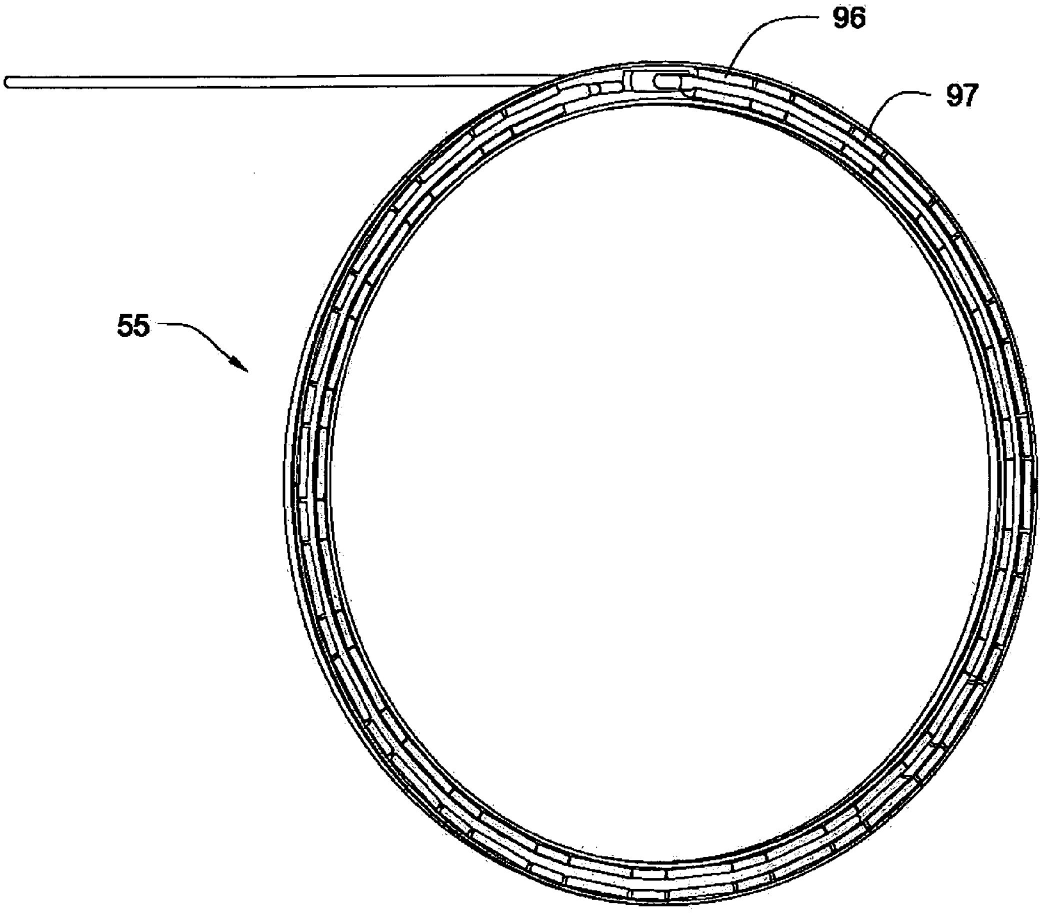
FIG. 13 is a perspective view of a magnetically conductive portion disposed within annular housing.
Figure 14:
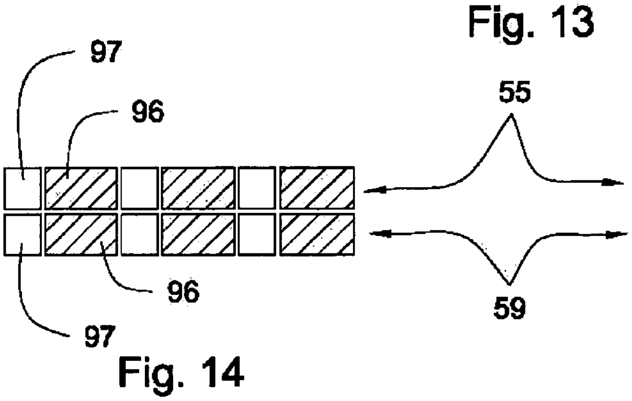
FIG. 14 is a perspective view of magnetically conductive portions from a first and a second mating communications element adjacent one another.
Figure 15:
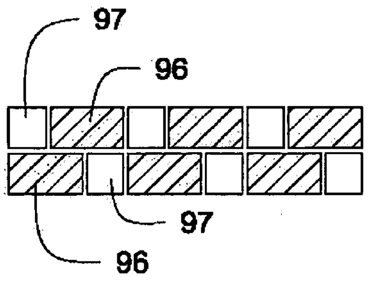
FIG. 15 is a perspective view of magnetically conductive portions from a first and a second mating communications element adjacent one another.

FIG. 13 is a perspective view of a mating communication element 55 composed of first magnetically conductive portions 96 adjacent to second portions 97 smaller than the first magnetically conductive portions. Because it is very difficult to predict the alignment of the magnetically conductive portions 96, 97 of the first and second mating communications elements 34, 35 when the downhole components are torqued together, the magnetically conductive portions 96, 97 are arranged in such a way so as to communicate effectively in any alignment. FIG. 14 shows an alignment which the communication element may couple. The first communication element 55 comprises the first portion 96 adjacent to a second smaller portion 97 opposite a second communication element 59 aligned so the first portions 96 mate with each other and the second portions 97 mate with each other. FIG. 15 shows an alternative alignment.

Figure 16:
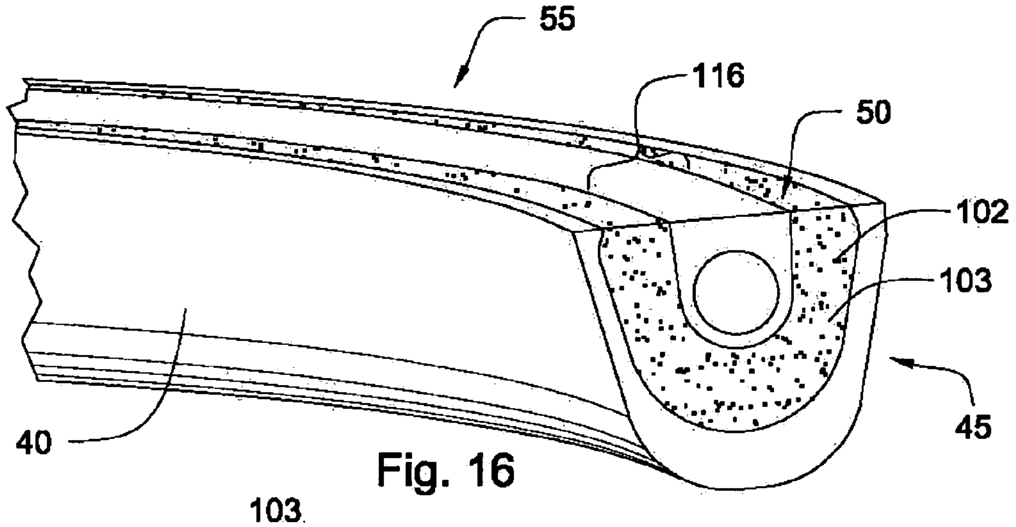
FIG. 16 is a perspective cross sectional view of a magnetically conductive portion.

FIG. 16 is a perspective view of the magnetically conductive portion 50 composed of a powdered metallic material 102 suspended in an electrically insulating material 103 The powdered metallic material 102 may be selected from the group consisting of Ni, Fe, Cu, Mo, Mn, Co, Cr, V, C, Si, alloys and combinations thereof. Wherein the powdered material 102 suspended in the electrically insulating portion 103 is disposed within the communication element 55 in the generally U shaped trough 45. A coil 41 resides within the recess 116. The powered metallic material 102 may all be of a single composition and only have a single curie temperature or may also comprise several different compositions and several different curie temperatures.

Figure 17:
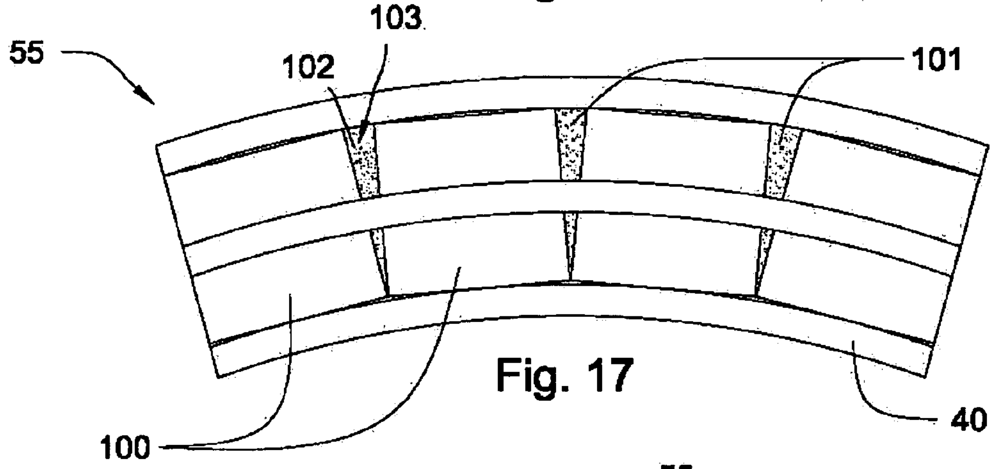
FIG. 17 is a detailed view of a magnetically conductive portion of a mating communications element.

The mating communication element 55 may also comprise powdered material 102 suspended in an electrically insulated material 103 filling the gaps 101 between the magnetically conductive segments 100 contained within the housing 40 as shown in the partial view of FIG. 17.

Figure 18:
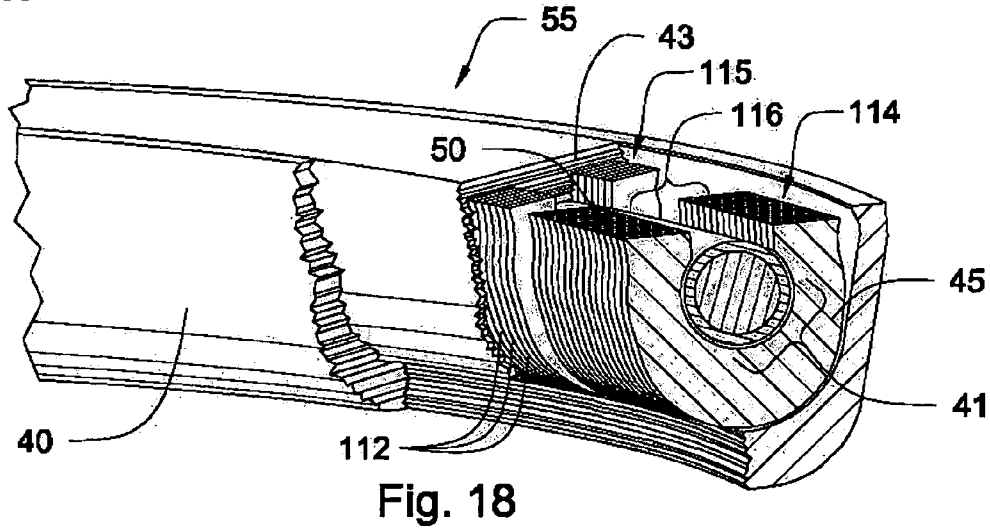
FIG. 18 is a perspective cross sectional view of a magnetically conductive portion.

FIG. 18 is a perspective cross sectional view of the magnetically conductive portion 50 within the mating communication element 55. The magnetically conductive portion 50 may be sintered or hot pressed. They may also comprise a plurality of laminated leaves 112. Each laminated leaf 112 may comprise different curie temperatures disposed within the communication element 50 and the housing 40, thus greater overall data transmission efficiency may be achieved throughout a drill string. Enclosed within the recess 116 of the trough 45 is the coil 41. Each segment 114 and 115 is composed of a plurality of laminated portions 112. The filler material 43 is disposed within the housing 40. It should be noted that a laminated portion may be used in connection with solid magnetically conductive portions. U.S. Patent Application Publication Number 2004-0164838 to Hall, which is herein incorporated for all that it teaches, discloses a method for making and using a laminated magnetically conductive portion suitable for use within a mating communications element 59.

Figure 19:
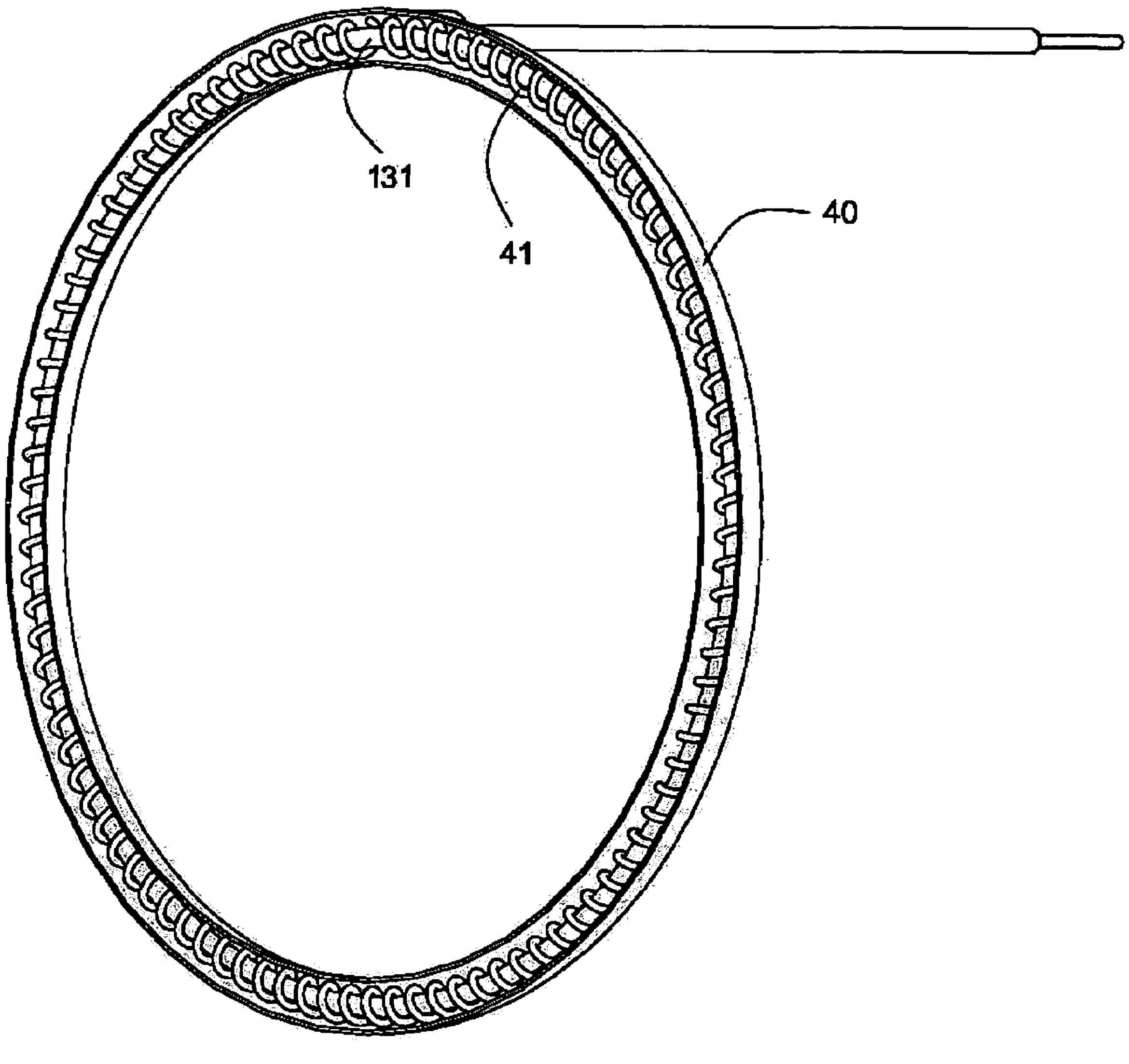
FIG. 19 is a perspective view of a mating communications element.

FIG. 19 is a perspective view of a mating communication element 55. The magnetically conductive portion 50 is a magnetic core 131. The magnetic core 131 may be a segmented core or a core made of multiple portions of different compositions which comprise different curie temperatures. The core is disposed with the housing 40 and a coil 45 is wrapped around the core 131. One such data transmission system comprising magnetically conductive cores and is compatible with the present invention is disclosed in U.S. Pat. No. 6,641,434, Boyle et, al. which is incorporated herein for all that it discloses.

Figure 20:
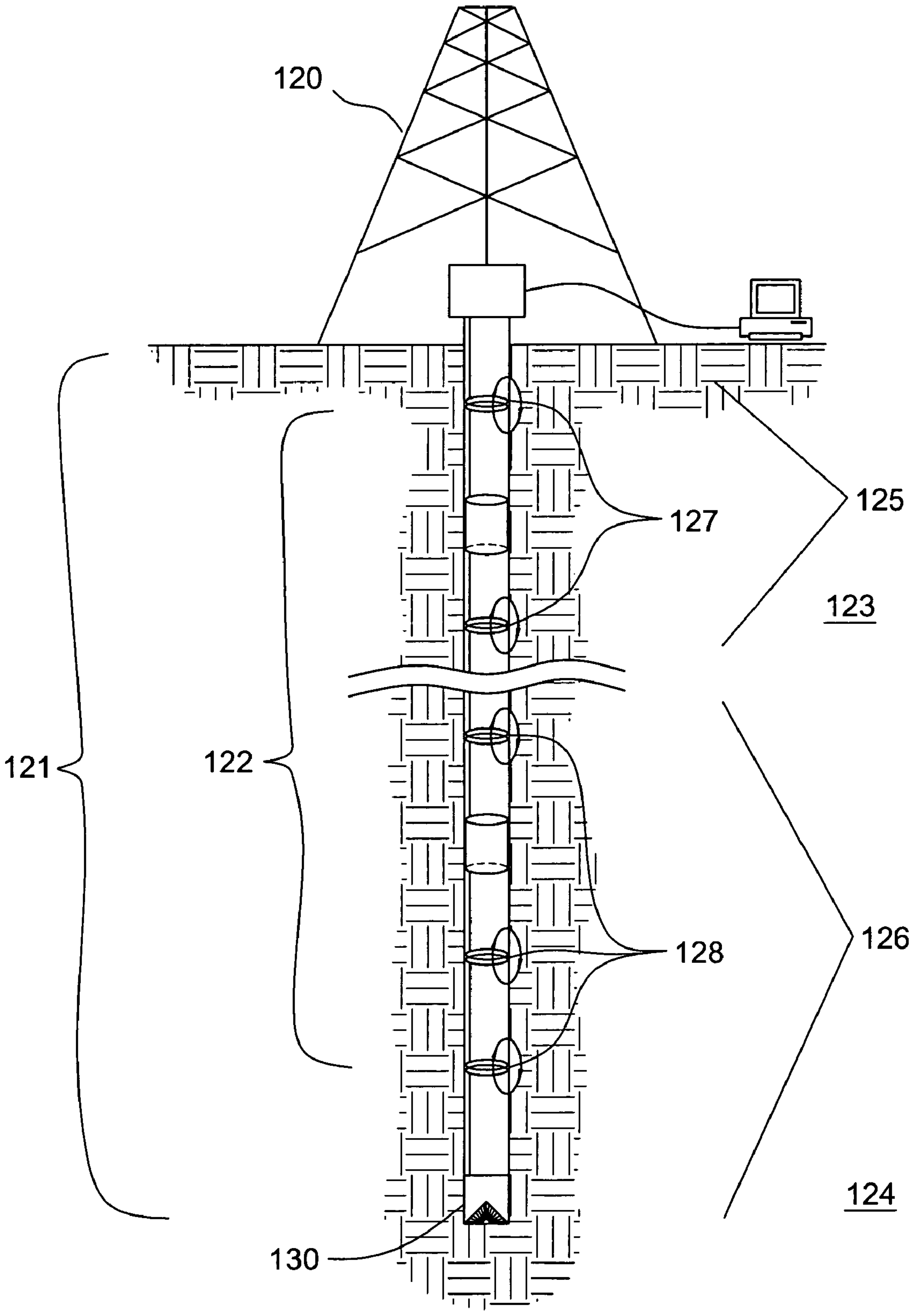
FIG. 20 is a perspective view of a downhole network in downhole environments.

FIG. 20 is a perspective view of a downhole network 122. The tool string 121 is connected to a derrick 120. The downhole tool string 121 comprises the network 122 for data transmission. The network 122 operates within at least two downhole environments 123 and 124. The first downhole environment 123 may comprise a first portion of the network 122 comprising mating communication elements 127 with the curie temperatures for data transmission efficiency in the first downhole environment 123. The second downhole environment 124 may comprise a second portion of the network 122 comprising mating communication elements 128 with the curie temperatures for data transmission efficiency in the second downhole environment 124. The second downhole environment 124 may have a much harsher environment than that of the first environment 123, such a higher temperatures and higher pressures. The mating communications elements 55 may comprise any of the aforementioned alloys and/or combinations thereof for data transmission efficiency in the downhole environments.

The downhole environments 123, 124 may comprise temperatures from 25 C to 275 C. Communications element 127 may alternatively comprise only a single curie temperature in cooler environments and communications elements 128 may comprise a single curie temperature adapted for higher temperatures. Such a system may comprise first and second pluralities 125, 126 of downhole components 34, 35 where communications elements 127 in the first plurality 125 comprise magnetically conductive portions 50 with a first curie temperature and the communications elements 128 of the second plurality 126 comprise magnetically conductive portions 50 (shown in FIG. 2) with a second curie temperature. Molypermalloy powder suspended in electrically insulating material 43 (shown in FIG. 2) may be used in hotter downhole environments. Drill collars are often used near the bottom-hole assembly 130 and may be adapted with communications elements 128 using molypermalloy powder as described in FIG. 16. Other communications elements 128 adapted for high temperatures may be used near the bottom-hole assembly 130. Communications elements 127 that transmit at high efficiency may be used in cooler environments along the drill string 121.

Whereas the present invention has been described in particular relation to the drawings attached hereto, it should be understood that other and further modifications apart from those shown or suggested herein, may be made within the scope and spirit of the present invention.

What is claimed is:

1. A system for transmitting data through downhole environments, comprising:

a downhole network integrated into a downhole tool string comprising a plurality of downhole components;

each component comprising a conductor intermediate and operably connected to mating communication elements and the communication elements being proximate the ends of the downhole component;

the communication elements comprising a plurality of segments, wherein at least two of the segments have different magnetically conductive materials comprising different curie temperatures.

2. The system of claim 1 wherein the downhole environments comprise temperatures between 25 C and 275 C.

3. The system of claim 1 wherein the downhole components are selected from the group consisting of drill pipes, drill collars, bottom-hole assemblies, reamers, jars and production pipes.

4. The system of claim 1 wherein the magnetically conductive portion is an annular trough disposed in an annular housing and wherein a coil resides within a recess of the trough.

5. The system of claim 4 wherein the magnetically conductive portion comprises a material comprising a composition selected from the group consisting of ferrite, Ni, Fe, Cu, Mo, Mn, Co, Cr, V, C, Si, alloys and combinations thereof.

6. The system of claim 5 wherein the magnetically conductive material is a metallic powder suspended in an electrically insulating material.

7. The system of claim 5 wherein the magnetically conductive portion comprises a laminated portion disposed within the housing.

8. The system of claim 5 wherein a single communication element comprises the segments of the magnetically conductive material.

9. The system of claim 5, wherein the magnetically conductive portion is a magnetic core.

10. The system of claim 1 wherein the mating elements within a first portion of a downhole tool string comprise a first curie temperature and the mating elements within a second portion of a downhole tool string comprise a second curie temperature.

11. The system of claim 1 wherein a first end of a downhole component comprises a first curie temperature and a second end of a downhole component comprises a second curie temperature.

12. The system of claim 8 wherein a first segment comprises a first curie temperature and a second segment comprises a second curie temperature.

13. The system of claim 8 wherein the first and the second segments are adjacent to each other within the housing.

14. The system of claim 12 wherein a third segment comprises a third curie temperature.

15. The system of claim 14 wherein the third segment is adjacent to the first and/or second segment within the housing.

16. The system of claim 1 wherein the magnetically conductive portion comprises a minimum magnetic permeability of 100 Mμ.

17. The system of claim 1 wherein the magnetically conductive portion comprises a maximum magnetic permeability of 800,000 Mμ.

18. The system of claim 1 wherein the mating communication elements further comprise an electrically insulating material.

19. The system of claim 18 wherein the electrically insulating material is a polymer and the polymer is a material selected from the group consisting of silicones, epoxies, and polyurethanes nylons, grease, rubber, polyethylene, polypropylene, polystyrene, polyether ether ketones, polyether ketone ketones and/or fluoropolymers.

20. A system for transmitting data through downhole environments, comprising:

a downhole network integrated into a downhole tool string comprising a first and second plurality of downhole components;

each component comprising a conductor intermediate and operably connected to communication elements and the communication elements being proximate the ends of the downhole component;

wherein the first plurality of downhole components comprises communication elements with a magnetically conductive portion comprising a first curie temperature and the second plurality downhole components comprises communications elements with a magnetically conductive portion comprising a second curie temperature.

21. The system of claim 20 wherein the downhole components are selected from the group consisting of drill pipes, drill collars, bottom-hole assemblies, reamers, jars and production pipes.

22. The system of claim 21 wherein the magnetically conductive portion comprises a material comprising a composition selected from the group consisting of ferrite, Ni, Fe, Cu, Mo, Mn, Co, Cr, V, C, Si, alloys and combinations thereof.

23. The system of claim 22 wherein the magnetically conductive material is a metallic powder suspended in an electrically insulating material.

24. The system of claim 20 wherein the magnetically conductive portion comprises a laminated portion disposed within the housing.

25. The system of claim 21 wherein the magnetically conductive portion comprises segments of the magnetically conductive material.

26. The system of claim 21, wherein the magnetically conductive portion is a magnetic core.

27. The system of claim 21 wherein the communication elements further comprise an electrically insulating material.

28. The system of claim 27 wherein the electrically insulating material is a polymer and the polymer is a material selected from the group consisting of silicones, epoxies, polyurethanes, nylons, grease, rubber, polyethylene, polypropylene polystyrene, polyether ether keytones, polyether keytone keytones and/or fluoropolymers.

* * * * *